United States Patent [19]

Isomura et al.

[11] Patent Number: 5,051,652
[45] Date of Patent: Sep. 24, 1991

[54] PANEL WITH ANTI-REFLECTIVE MULTI-LAYERED FILM THEREON

[75] Inventors: Toshiaki Isomura, Yokohama; Tsunemitsu Koizumi, Isehara, both of Japan

[73] Assignee: Asahi Glass Company, Ltd., Tokyo, Japan

[21] Appl. No.: 445,026

[22] Filed: Dec. 4, 1989

[30] Foreign Application Priority Data

Dec. 6, 1988 [JP] Japan ............................... 63-306818
Jun. 20, 1989 [JP] Japan ............................... 1-71228[U]

[51] Int. Cl.$^5$ ........................ H01J 31/00; H04N 5/72
[52] U.S. Cl. .................................... 313/479; 313/478; 358/250; 358/253
[58] Field of Search ................ 313/478, 479; 358/245, 358/250, 253

[56] References Cited

U.S. PATENT DOCUMENTS 4,563,612 1/1986 Deal et al. ............................ 313/479
4,804,883 2/1989 Müller et al. ........................ 313/479

Primary Examiner—Donald J. Yusko
Assistant Examiner—Diab Hamadi
Attorney, Agent, or Firm—Oblon, Spivak, McClelland, Maier & Neustadt

[57] ABSTRACT

A panel with an anti-reflective multi-layered film thereon comprises a glass substrate, an electricity collector for leading static electricity which is formed by baking an electric conductive frit paste on the glass substrate, and has a rough surface, an anti-reflective multi-layered film formed on the glass substrate so as to cover at least a portion of the electricity collector and wherein the film includes an inner electric conductive layer to provide antistatic effect, wherein the thickness of the anti-reflective multi-layered film is less than the maximum height of the surface roughness of the electricity collector, and a lead terminal for earth provided on the outermost layer of the anti-reflective film and above the electricity collector, whereby static electricity produced on the glass substrate with the anti-reflective multi-layered film is collected at the electricity collector through the electric conductive layer so that the static electricity is led to the outside through the lead terminal for earth via the electricity collector.

11 Claims, 3 Drawing Sheets 5,051,652

1

PANEL WITH ANTI-REFLECTIVE MULTI-LAYERED FILM THEREON

FIELD AND BACKGROUND OF THE INVENTION

The present invention relates to a panel with an anti-reflective multi-layered film thereon.

Various types of an anti-reflective film consisting of a single or a plurality of layers have been proposed wherein the film is coated on the front surface of a display device such as a cathode ray tube or on a panel to be disposed in front of the display device in order to eliminate the difficulty that the display portion is hardly seen due to an image by the reflection of an external light, and to reduce a degree of reflection.

As the anti-reflective film, there have been proposed a single layered anti-reflective film wherein a material having a low refractive index is used to form a layer having an optical thickness of $\lambda/4$ of a wave length which causes reflection, a two-layered anti-reflective film wherein two layers of a low refractive index layer and a high refractive index layer are coated to have respective optical thickness of $\lambda/4$ and $\lambda/2$ when viewed from the side of air, a three-layered anti-reflective film wherein three layers of a low refractive index layer, a high refractive index layer and an intermediate refractive index layer are coated to have respective optical thickness of $\lambda/4$, $\lambda/2$ and $\lambda/4$ when viewed from the side of air, and a four anti-reflective film wherein four layers of a low refractive index layer, a high refractive index layer, an intermediate refractive index layer and a low refractive index layer to have respective optical thickness of $\lambda/4$, $\lambda/2$, $\lambda/4$ and $\lambda/4$ when viewed from the side of air.

On the other hand, glass or a plastic material used for a cathode ray tube or a front panel has no electric conducting property, and the surface of the cathode ray tube is electrified by an amount of static electricity produced during the operation of the cathode ray tube. The static electricity causes an electric discharge to a human body or is apt to attract dust. This causes a great problem in a terminal of a computer, a display device for a word processor, and so on.

Accordingly, there has been studied to propose an anti-reflective film having electric conductive property, namely, an anti-reflective film wherein at least one layer is composed of a transparent material having electric conductive property. There has been known as a transparent conductive film, ITO (tin-doped indium oxide), $SnO_2$ (tin oxide) and so on. However, these materials have a high refractive index (for instance, ITO has a refractive index of about 2.0 and $SnO_2$ has 1.90), and therefore the construction of film for the anti-reflective film is limited. Namely, since the transparent electric conductive layer has a high refractive index, it does not function as a single-layered anti-reflective film and rather, it enhances reflectivity. Further, in a case of an anti-reflective multi-layered film, it is necessary to form a film having a low refractive index for the outermost layer facing the side of air as is clear from the construction of the above-mentioned anti-reflective film. Since there is no material for the transparent conductive film which satisfies the property of a low refractive index as required, it is necessary that a transparent conductive film is used for an inner layer and an insulating material having a low refractive index such a $MgF_2$, $SiO_2$ or the like is used for the outermost layer.

Various methods have been proposed to produce a panel with an anti-reflective multi-layered film wherein an electric charge produced on the surface of the panel by the electrification is led to the ground through a transparent conductive film which is formed as an inner layer in the anti-reflective-multi-layered film.

An attempt to let an electric charge escape by forming a solder layer on the outermost layer of the anti-reflective film was made. As a result, it was found that the wettability of the outermost layer, e.g. $MgF_2$ or $SiO_2$ of the anti-reflective film to the solder layer was not so good, and provision of the solder layer on the outermost layer did not sufficiently function as earthing at a low resistance value because a non-conductive layer was interposed.

An attempt of letting an electric charge escape by directly contacting a plate spring made of metal on the outermost layer of the anti-reflective film was made. However, the resistance between the plate spring and the transparent conductive layer was very high because the outermost layer without electric conductive property was intervened and a complete contacting state of the plate spring could not be obtained, whereby an electric breakdown was caused at a part of the anti-reflective multi-layered film to thereby deteriorate the film.

Further, an attempt of bonding an electric conductive tape comprising a copper foil with an adhesive to the surface of the multi-layered film was made. However, the electric conductivity of the adhesive was not sufficient and an electric breakdown was caused.

SUMMARY OF THE INVENTION

It is an object of the present invention to eliminate the above-mentioned problems and to provide a panel with an anti-reflective multi layered film thereon which comprises a glass substrate, an electricity collector for leading static electricity which is formed by baking an electric conductive frit paste on the glass substrate, and has a rough surface, an anti-reflective multi-layered film formed on said glass substrate so as to cover at least a portion of the electricity collector and including an inner electric conductive layer to provide antistatic effect, wherein the thickness of said anti-reflective multi-layered film is less than the maximum height of the surface roughness of said electricity collector, and a lead terminal for earth provided on the outermost layer of the anti-reflective film and above the electricity collector, whereby static electricity produced on the glass substrate with the anti reflective multi-layered film is collected at the electricity collector through the electric conductive layer so that the static electricity is led to the outside through the lead terminal for earth via the electricity collector.

BRIEF DESCRIPTION OF THE DRAWINGS

In the accompanying drawings:

FIGS. 3(a) and 3(b) are plane views of an embodiment of the panel with an anti-reflective multi-layered film having antistatic effect of the present invention;

Embodiments of the process for producing a panel with an anti reflective multi-layered film having antistatic effect of the present invention will be described with reference to the drawings.

DESCRIPTION OF THE PREFERRED EMBODIMENTS

Figure 1:
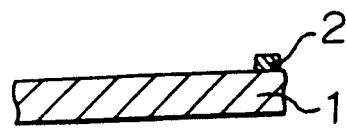
FIGS. 1(1), 1(2), 1(3)(a), 1(3)(b), 1(4)(a) and 1(4)(b) represent a diagram showing an embodiment of the process of preparing a panel with an anti-reflective multi-layered film thereon having antistatic effect according to the present invention.
Figure 1:
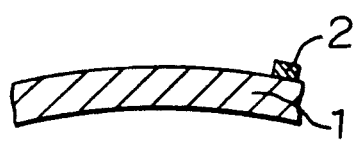
Figure 1:
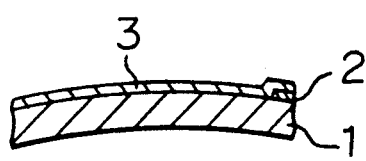
Figure 1:
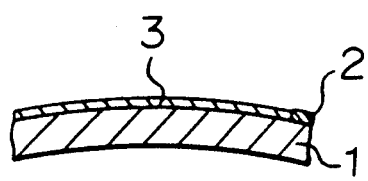
Figure 1:
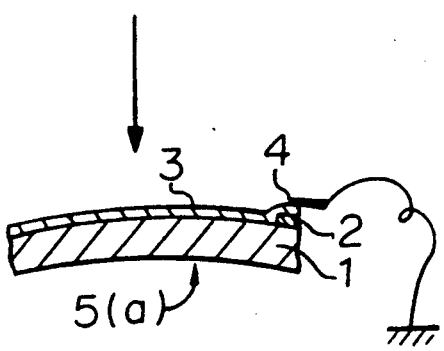
Figure 1:
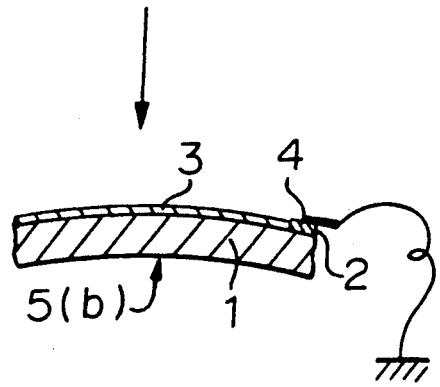

In FIG. 1, a reference numeral 1 designates a glass substrate, a numeral 2 designates an electricity collector formed by an electric conductive frit paste, a numeral 3 designates an anti-reflective multi-layered film having an inner conductive layer and having antistatic effect, a numeral 4 designates a lead terminal for earth, and a numeral 5 designates a panel with an anti-reflective multi-layered film having antistatic effect of the present invention.

As shown in FIG. 1(1), an electric conductive frit paste 2 is screen-printed or-coated by using a roll coater or a meniscus coater or the like at a portion near the periphery of a surface of the glass substrate 1 after the glass substrate 1 has been cleaned. The electric conductive frit paste 2 may be formed in a dotted form or in a linear form having a length. Further, it may be formed at plural spots on the glass substrate 1.

Then, the electric conductive frit paste 2 is provisionally dried by heating it at about 80° C.–120° C., and it is baked at the inherent baking temperature to thereby bond the paste 2 on the glass substrate.

As the electric conductive frit paste 2 used in the present invention, it is preferable to use such material that powder of a metal having excellent electric conductivity such as silver, aluminum, gold, copper, platinum, palladium or the like is mixed with glass frit having a low melting point (for instance, $PbO-B_2O_3$ series glass frit, $PbO-B_2O_3-SiO_2$ series glass frit, or $PbO-ZnO-B_2O_3$ series glass frit), and an organic solvent, a thickening agent and an additive or additives are added to the mixture, if necessary, to obtain a paste of mixture. It is necessary for the electric conductive frit paste to have a range of baking temperature wherein the paste can be bonded to the glass substrate at a temperature range sufficient to bending glass (580° C.–640° C.) or strengthening the glass substrate (610° C.–680° C.). With use of the above-mentioned glass frit, a panel having a curved surface, for instance, a panel which is capable of attaching to the front surface of a cathode ray tube or a strengthened panel can be prepared at the same time of baking the electric conductive glass frit 2. FIG. 1(2) shows a case that the glass substrate 1 is subjected to a predetermined bending operation at the same time of the baking of the electric conductive frit paste 2.

A baking temperature for the electric conductive frit paste 2 is determined depending on a composition of the paste 2. The baking temperature is substantially same or very close to the softening temperature of glass. Accordingly, when a panel having a predetermined curved surface, for instance, a curved surface which is capable of attaching to the front surface of a cathode ray tube is prepared, the glass substrate is bend-shaped before, after or at the same time of the baking of the electric conductive frit paste 2. FIG. 1(2) shows a case that a bend-shaping operation is applied to the glass substrate 1.

In the next place, the anti reflective multi-layered film 3 having antistatic effect is formed on the glass substrate on which the electric conductive frit paste 2 is formed by baking. When the film 3 is to be formed, it may be formed to cover a part or its entirety of the electricity collector 2 made of the electric conductive frit paste as shown in FIG. 1(3)(a). Or, the film 3 may be formed on the glass substrate 1 except the electricity collector 2 by a method of, for instance, masking the electricity collector 2 so that the film 3 is in contact with the electricity collector 2 as shown in FIG. 1(3)(b).

It is obliged to form the outermost layer of the anti-reflective film by an insulating material having a low refractive index as described above. As a material for the outermost layer, it is sufficient to use a material having a low refractive index such as $MgF_2$, $SiO_2$, $CaF_2$, cryolite or the like. In particular, $MgF_2$ or $SiO_2$ is preferably used from the viewpoint that it is chemically and physically durable, allows a large scale production, and is easily available. Further, $SiO_2$ including a small amount of Zr, Hf, Ti, In, Ta or Sn or the like to further improve acid resistance, for instance, $SiTi_xO_y$, $SiZr_xO_y$ or the like can be used.

Finally, the lead terminal for earth 4 is provided on the outermost layer of the anti-reflective film 3 and above the electricity collectors 2 as shown in FIG. 1(4)(a), or it is attached to the electricity collector 2 as shown in FIG. 1(4)(b). Thus, the panel 5 with an anti-reflective multi-layered film having antistatic effect is prepared. The lead terminal for earth 4 may be formed by solder, or by attaching a plate spring. Or, a plate spring may be sandwiched when the panel with an anti reflective multi-layered film is fitted to a framework of display or television.

In the panel 5 with an anti-reflective multi-layered film having antistatic effect prepared as described above, it is so adapted that static electricity produced on the glass substrate on which the anti-reflective multi-layered film is formed is collected to the electricity collector 2 through an electric conductive layer in the film and it is led to the outside through the lead terminal for earth 4.

In a case of a panel 5(b) as shown in FIG. 1(4)(b) an end portion of an electric conductive layer in the anti-reflective multi-layered film 3 having antistatic effect and the electricity collector 2, and the electricity collector 2 and the lead terminal for earth 4 are respectively in direct contact with each other even though the electric conductive layer is formed at any number of layer from the glass plate in the anti-reflective multi-layered film 3. Accordingly, the resistance between the electric conductive layer in the anti-reflective multi layered film 3 and the lead terminal for earth 4 is very low as about 0.5 $\Omega$–3 $\Omega$, so that it is easy to lead the static electricity to the ground.

Figure 6A:
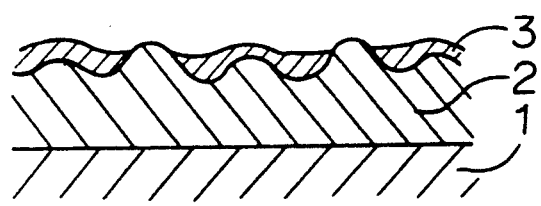
FIGS. 6(a) and 6(b) are enlarged cross-sectional view showing a part of the electricity collector of the panel shown in FIG. 1(4)(a).
Figure 6B:
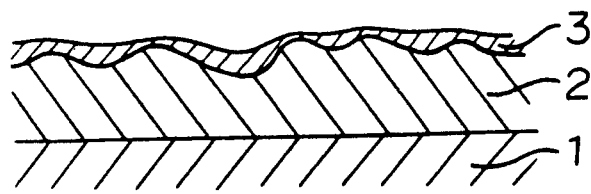

In a case of a panel 5(a) as shown in FIG. 1(4)(a) the electric conductive layer in the anti-reflective multi-layered film 3 and the electricity collector 2, and the electricity collector 2 and the lead terminal for earth 4 are respectively do not directly contact with each other, and static electricity is led through the insulating layer, whereby the resistance between the electric conductive layer in the anti-reflective multi-layered film 3 and the lead terminal for earth 4 becomes relatively high in comparison with the above-mentioned case wherein the panel as shown in FIG. 1(4)(b) is used. However, in the present invention, the electricity collector of the electric conductive frit paste is formed to have a surface roughness having the maximum height more than the thickness of the anti-reflective multi-layered film, in particular, more than 0.5 μm. Accordingly, even though the anti-reflective multi-layered film (usually having a thickness of about 2,000 Å–3,000 Å) is formed on the electricity collector, a plurality of projections in the uneven surface of the electricity collector penetrate the anti-reflective multi-layered film and project from the surface of the anti-reflective multi-layered film as shown in FIG. 6(a), or a plurality of projections in the uneven surface of the electricity collector come near the surface of the anti-reflective multi-layered film as shown in FIG. 6(b), whereby it is possible to form the lead terminal for earth having a sufficiently low resistance.

In the description of the present invention, "surface roughness" and "maximum height" mean the surface roughness and the maximum height (Rmax) described in Japanese Industrial Standard JIS B 0601-1982 "Definitions and Designation of Surface Roughness".

Figure 5:
FIG. 5 is a plane view showing another embodiment of the electricity collector of the present invention.

In a case that the panel as described above is attached to a cathode ray tube with a ultraviolet-curing resin and the electricity collector is formed to have a shape, for instance, the shape as shown in FIG. 5 by the proposed electric conductive frit paste, there is a possibility that the electric collector absorbs and reflects ultraviolet rays to form partially a shadow, and the shadow portion produces a non-cured portion because the ultraviolet rays are not irradiated to the ultraviolet-curing resin. As another embodiment of the present invention, there is provided a panel with an anti-reflective film which eliminates a danger of producing a non-cured portion in the ultraviolet-curing resin, provides a sufficient antistatic effect and has an excellent geometric shape. -Namely, there is provided a panel with an anti-reflective multi layered film having antistatic effect wherein the electricity collector has a ultraviolet ray transmitting portion.

FIG. 3 is a plane view of an embodiment of the panel with an anti-reflective multi layered film having antistatic effect of the present invention. In FIG. 3, a numeral 1 designates a glass substrate, and a numeral 2 designates an electricity collector formed by an electric conductive frit paste. An anti-reflective film 3 is formed on the entire surface of the glass substrate with the electricity collector 2.

FIG. 3a shows a panel in which two electricity collectors 2 are formed, and FIG. 3b shows a panel in which three electricity collectors 2 are formed. In the present invention, however, the position and the number of the electricity collectors 2 are not particularly limited.

Figure 4A:
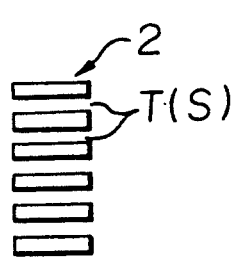
FIGS. 4(1a) and 4(b) are plane views showing embodiments of an electricity collector used for the panel with an anti-reflective multi-layered film having antistatic effect of the present invention.
Figure 4B:
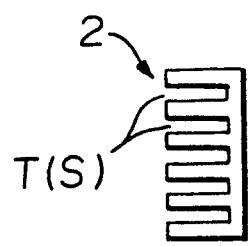

FIG. 4 are respectively plane views showing the shape of the electricity collectors according to the present invention. The collectors 2 as shown in FIG. 4 are featurized by having ultraviolet ray transmitting portions T. It is desirable that the electricity collector has a plurality of slit-shaped ultraviolet ray transmitting portions S. The shapes as shown in FIGS. 4a and 4b are exemplified, however, the shape of the electricity collector is not limited to those and it is sufficient that it has a ultraviolet ray transmitting portion.

Now, the present invention will be described in detail with reference to Examples. However, it should be understood that the present invention is by no means restricted to such specific Examples.

EXAMPLE 1

An electric conductive frit paste having a composition of 10 weight % of an organic binder, 81 weight % of Ag, 6.6 weight % of PbO, 1.2 weight % of $B_2O_3$, 0.6 weight % of $SiO_2$, and 0.6 weight % of $Al_2O_3$ was applied to two spots (as shown in FIG. 3a) in the peripheral portion on a glass substrate 1 (450 mm × 350 mm) by screen-printing to thereby form a shape as shown in FIG. 5. The frit paste was dried at 100° C. for 5 minutes, and then it was baked in a heating furnace at 700° C. for 4 minutes to form collectors 2 of electric conductive frit. The glass substrate 1 was placed on a bending mold and heated so that the glass substrate was bent by the action of dead weight wherein the surface on which the electricity collectors are formed constituted a convex surface. Then, the glass substrate was quenched for strengthening. Then, the electricity collectors were masked, and an anti-reflective multi-layered film having the construction of

|  | 1st layer | 2nd layer | 3rd layer | 4th layer |
|---|---|---|---|---|
| Glass | ITO | $MgF_2$ | $ZrO_2$ + $TiO_2$ | $MgF_2$ |
| Thickness: | 170 Å | 260 Å | 1200 Å | 900 Å | was formed on the convex surface of the glass substrate 1 by successively conducting vacuum deposition methods so that the anti-reflective multi-layered film was formed on the substrate except the electricity collectors 2 as shown in FIGS. 1(4)(b). Thus, a panel with an anti-reflective multi-layered film having antistatic effect of the present invention (sample A) was prepared.

In heat tests (the sample A was kept at −40° C. and 150° C. for 4 hours respectively) and dissolving tests (it was immersed in 50% of $CH_3COOH$ aq for 24 hours and 10% of NaCl aq for 24 hours), there was no change of anti-reflective multi-layered film and the electricity collectors.

Further, abrasion resistance tests by reciprocating 20 times with an eraser and bonding tests with an adhesive tape were carried out for the anti-reflective multi-layered film and the electricity collectors of the sample A. In these tests, no change was found.

Lead terminals for earth was formed on the electricity collectors 2 of the sample A by using ordinary solder, and the resistance between the electric conductive layer (ITO layer) in the anti-reflective multi-layered film 3 and the lead terminal for earth was measured. As a result, the resistance was about 0.5 Ω.

Figure 2:
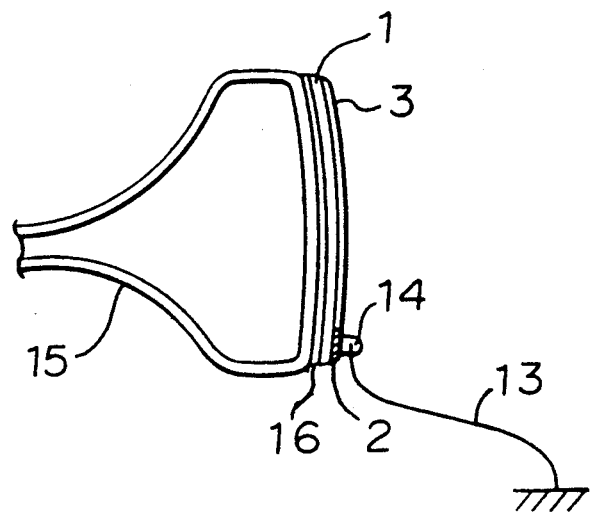
FIG. 2 is a longitudinal cross-sectional view of a display device with a panel prepared by an embodiment of the present invention.

The panel prepared was attached to the front surface of a cathode ray tube 15 with an adhesive 16 as shown in FIG. 2 to thereby form a display- device. The lead terminal for earth was connected to the ground by a lead wire 13, and 10,000 times of ON-OFF operations of the switch of the cathode ray tube were repeated. The problem of electric breakdown did not occur at all, and there was no electric shock to a finger when touched the surface of the panel.

EXAMPLE 2

A glass substrate with electricity collectors formed by baking the electric conductive frit paste was prepared in the same manner as Example 1. The surface of the electricity collectors had a surface roughness wherein the maximum height was about 0.5 μm. An anti-reflective multi-layered film was formed on the entire surface of the glass substrate in the same manner as in Example 1 to form a panel as shown in FIG. 1(4)(a). Thus, the panel with an anti-reflective multi-layered film having antistatic effect (sample B) was prepared.

Humidity resistance tests as described in MIL-C-675 were conducted on the sample B in the same manner as in Example. As a result, there was no change in the anti-reflective multi-layered film and the electricity collectors after the tests, and there was no deterioration of them in comparison with the state before the tests.

Further, tests on the heat resistance property, the dissolving property, the abrasion resistance property and the bonding property were conducted in the same manner as in Example 1. No change was found.

A plate spring was brought into contact with the outermost layer ($MgF_2$ layer) of the anti-reflective multi-layered film and the upper portion of an electricity collector to form a lead terminal for earth, and the resistance between the conductive layer (ITO layer) in the anti-reflective multi-layered film and the lead terminal for earth (plate spring) was measured. The resistance was about 1 Ω.

The panel was attached to the front surface of a cathode ray tube with an adhesive in the same manner as in Example 1 to form a display device. The lead terminal for earth was grounded by a lead wire, and 10,000 times of ON-OFF operations of the switch of the cathode ray tube were repeated. A problem of electric breakdown did not occur at all, and there was no electric shock to a finger when touched the surface of the panel.

EXAMPLE 3

An electric conductive frit paste having a composition of 10 weight % of an organic binder, 81 weight % of Ag, 6.6 weight % of PbO, 1.2 weight % of $B_2O_3$, 0.6 weight % of $SiO_2$ and 0.6 weight % of $Al_2O_3$ was applied to two spots in a form as shown in FIG. 4a on the circumference of a surface of a glass substrate 1 (450 mm × 350 mm) by using a roll coater. The glass substrate with the frit paste was dried at 100° C. for 5 minutes, and it was baked in a heating furnace at 700° C. for 4 minutes to thereby form electric collectors 2 of the electric conductive frit as shown in FIG. 3a. The glass substrate was placed on a bending mold when it was heated, whereby it was bent by the action of dead weight so that the surface on which the electricity collectors were formed constituted a convex surface. Then, the glass substrate was rapidly quenched for strengthening. An anti-reflective multi-layered film having a construction of

|  | 1st layer | 2nd layer | 3rd layer |
|---|---|---|---|
| Glass | ITO | $ZrO_2$ | $MgF_2$ |
| Optical thickness: | λ/4 | λ/2 | λ/4 |

(λ = 550 nm)

was formed sequentially by vacuum deposition methods so as to have the above-mentioned optical thickness while the electricity collectors were masked on the convex surface of the glass substrate 1. Thus, a panel with an anti reflective multi layered film having antistatic effect (sample C) was prepared wherein the anti-reflective multi-layered film was formed on the glass substrate except the electricity collectors 2 as shown in FIG. 1(4)(b).

Heat resistance tests (it was heated at −40° C. and 150° C. for 4 hours respectively) and dissolving tests (it was immersed in 50% of $CH_3COOH$ aq for 24 hours and in 10% of NaCl aq for 24 hours) were respectively conducted. As a result, no change was found in the anti-reflective multi-layered film and the electricity collectors.

Further, abrasion resistance tests by reciprocating 20 times by using an eraser and bonding tests by using an adhesive tape were conducted on the anti-reflective multi-layered film and the electricity collectors of sample C. As a result, no change was found.

A lead terminal for earth was formed on an electricity collector of sample C by using ordinary solder 14, and the resistance between the electric conductive layer (ITO layer) in the anti-reflective multi-layered film and the lead terminal for earth was measured. The resistance was about 0.5 Ω.

The panel of sample C was attached to the front surface of a cathode ray tube 15 with an adhesive 16 of a ultraviolet-curing resin as shown in FIG. 2, followed by curing the resin by irradiating ultraviolet rays. In this case, there was not found any non-cured portion of the ultraviolet-curing resin on a display device.

The lead terminal for earth was grounded by a lead wire 13, and 10,000 times of ON-OFF operations of the switch of the cathode ray tube were repeated. As a result, there was no problem of electric breakdown and no electric shock was felt on a finger when touched the surface of the panel.

EXAMPLE 4

Three electricity collectors (having a shape as shown in FIG. 4b) were formed on a glass substrate as shown in FIG. 3b by baking the electric conductive frit paste in the same manner as in Example 3. The surface of each of the electricity collectors has a surface roughness having the maximum height of about 1 μm. Then, the same anti-reflective multi-layered film as in Example 3 was formed on the entire surface of the glass substrate as shown in FIG. 1(4)(a), whereby a panel with the antireflective multi-layered film having antistatic effect was prepared (it is referred to as sample D).

Humidity resistance tests described in MIL-C-675A were conducted on sample D in the same manner as in Example 3. As a result, there was no change in the anti-reflective multi-layered film and the electricity collectors after the tests, and there was no deterioration.

Various tests on the heat resistance property, the dissolving property, the abrasion resistance property and the bonding property were conducted in the same manner as in Example 3. However, there was no change.

A plate spring was brought to contact with on the outermost layer of the anti-reflective multi-layered film ($MgF_2$ layer) and above an electricity collector of sample B to thereby form a lead terminal for earth, and the resistance between the electric conductive layer (ITO layer) of the anti-reflective multi-layered film and the lead terminal for earth (plate spring) was measured. The resistance was about 1 Ω.

The panel was attached to the front surface of a cathode ray tube with an adhesive 16 of a ultraviolet-curing resin to form a display device in the same manner as in Example 3. In this case also, there was not found any non-cured portion in the ultraviolet-curing resin.

The lead terminal for earth was grounded by a lead wire, and 10,000 times of ON-OFF operations of the switch of the cathode ray tube were repeated. As a result, there was no problem such as electric breakdown, and there was no electrical shock on a finger when touched the surface of the panel.

COMPARATIVE EXAMPLE

An anti-reflective multi-layered film was formed on a surface of a glass substrate which is same as in Example 1 except forming any electricity collector (it is referred to as sample E).

A plate spring was brought to contact with a point of the circumference of the outermost layer (MgF$_2$ layer) of the anti-reflective multi-layered film of sample E to form a lead terminal for earth, and the resistance between the electric conductive layer (ITO layer) in the anti-reflective multi-layered film and the lead terminal for earth was measured. The resistance in the order of $10^8$ Ω.

The panel thus formed was attached to the front surface of a cathode ray tube in the same manner as in Examples 1 and 2. The lead terminal for earth was grounded by a lead wire, and 10,000 times of ON-OFF operations of the switch of the cathode ray tube were repeated. As a result, there took place electric breakdown near the plate spring and the anti-reflective multi-layered film was greatly deteriorated.

In accordance with the present invention, a panel with an anti-reflective multi-layered film having antistatic effect in which static electricity on the glass substrate can be led through the electric conductive layer of the anti-reflective multi-layered film to the ground at sufficiently low resistance, and which does not cause electric breakdown and deterioration of the anti-reflective multi layered film, can be provided.

The present invention is applicable to any type of anti-reflective multi-layered film. Namely, static electricity can be passed to the ground at sufficient low resistance by providing the electricity collectors formed by baking the electric conductive frit paste even when the electric conductive layer is formed at the nearest layer to the glass substrate, or the electric conductive layer is formed at the second layer or the layer remote from the second layer with respect to the glass substrate.

In the present invention, since the electricity collectors are formed by baking the electric conductive frit paste on the glass substrate at a high temperature, the electricity collectors are closely contacted to the glass substrate at a high bonding strength. Further, it has excellent humidity resistance property, is chemically and mechanically stable as is clear from Examples, and has wide practical applications.

Further, in the present invention, since the electricity collectors can be formed by baking at the same time of bending and/or strengthening operations of the glass substrate, the panel of the present invention can be effectively produced. The electricity collectors are previously formed before the anti-reflective multi-layered film is formed. Accordingly, it is possible to supply the panel prepared in accordance with the present invention in a stable manner without damaging the film after the anti-reflective multi-layered film has been formed.

Further, by forming the ultraviolet ray transmitting portion in the electricity collector in the panel with the anti-reflective multi-layered film having antistatic effect, there is provided a panel with an anti-reflective multi-layered film having antistatic effect which does not produce a non-cured portion in the ultraviolet-curing resin even when the panel is attached to a cathode ray tube with such resin.

What is claimed is:

1. A panel with an anti-reflective multi-layered film thereon which comprises
    a glass substrate,
    an electricity collector for leading static electricity which is formed by baking an electric conductive frit paste on the glass substrate,
    an anti-reflective multi-layered film formed on the glass substrate except the electricity collector, which has an inner electric conductive layer to provide antistatic effect, and
    a lead terminal for earth formed on the electricity collector, whereby static electricity produced on the glass substrate with the anti-reflective multi-layered film is collected at the electricity collector through the electric conductive layer so that the static electricity is led to the outside through the lead terminal for earth via the electricity collector.

2. The panel with an anti-reflective multi-layered film thereon according to claim 1, wherein the outermost layer of the anti reflective film is made of MgF$_2$ or SiO$_2$.

3. The panel with an anti-reflective multi-layered film thereon according to claim 1, wherein the electricity collector has a ultraviolet ray transmitting portion.

4. The panel with an anti-reflective multi-layered film thereon according to claim 3, wherein the electricity collector has a plurality of slit-shaped ultraviolet ray transmitting portions.

5. A cathode ray tube which comprises a cathode ray tube main body,
    a ultraviolet-curing resin layer formed on the front surface of the cathode ray tube main body, and
    a panel with an anti-reflective multi-layered film which ha antistatic effect defined in claim 1 and has a surface without an anti-reflective multi-layered film thereon, which is attached to the ultraviolet-curing resin layer.

6. A panel with an anti-reflective multi-layered film thereon which comprises:
    a glass substrate,
    an electricity collector for leading static electricity which is formed by baking an electric conductive paste on the glass substrate, and which has a rough surface,
    an anti-reflective multi-layered film formed on said glass substrate so as to cover at least a portion of the electricity collector and including an inner electric conductive layer to provide anti-static affect, wherein the thickness of said anti-reflective multi-layered film is less than the maximum height of the surface roughness of said electricity collector, and
    a lead terminal for each provided on the outer most layer of the anti-reflective film and above the electricity collector, whereby static electricity produced on the glass substrate with the anti-reflective multi-layered film is collected at the electricity collector through the electric conductive layer so that the static electricity is led to the outside through the lead terminal for earth via the electricity collector.

7. The panel with an anti-reflective multi-layered film thereon according to claim 6, wherein the surface of the electricity collector has a surface roughness of at least 0.5 μm in the maximum height.

8. The panel with an anti-reflective multi-layered film thereon according to claim 6, wherein the outermost layer of the anti-reflective film is made of $MgF_2$ or $SiO_2$.

9. The panel with an anti-reflective multi-layered film thereon according to claim 6, wherein the electricity collector has an ultraviolet ray transmitting portion.

10. The panel with an anti-reflective multi-layered film thereon according to claim 6, wherein the electricity collector has a plurality of slit-shaped ultraviolet ray transmitting portions.

11. A cathode ray tube which comprises a cathode ray tube main body,
a ultraviolet curing resin layer formed on the front surface of the cathode ray tube main body, and
a panel with an anti-reflective multi-layered film which has anti-static affect defined in claim 6, and has a surface without an anti-reflective multi-layer film thereon which is attached to the ultraviolet-curing resin layer.

* * * * *